US012566250B2

(12) United States Patent
Ochs et al.

(10) Patent No.: US 12,566,250 B2
(45) Date of Patent: Mar. 3, 2026

(54) METHODS FOR ESTIMATING DYNAMIC GROUND CLUTTER IN A VEHICLE-MOUNTED FREQUENCY MODULATED CONTINUOUS WAVE RADAR

(71) Applicant: Ainstein AI Inc., Lawrence, KS (US)

(72) Inventors: David S. Ochs, Lawrence, KS (US); Zhaohong Zhang, Missouri City, TX (US)

(73) Assignee: Ainstein AI Inc., Lawrence, KS (US)

( * ) Notice: Subject to any disclaimer, the term of this patent is extended or adjusted under 35 U.S.C. 154(b) by 431 days.

(21) Appl. No.: 18/300,779

(22) Filed: Apr. 14, 2023

(65) Prior Publication Data

US 2023/0333210 A1 Oct. 19, 2023

Related U.S. Application Data

(60) Provisional application No. 63/362,975, filed on Apr. 14, 2022.

(51) Int. Cl.
| | |
|---|---|
| *G01S 7/41* | (2006.01) |
| *G01S 13/58* | (2006.01) |
| *G01S 13/60* | (2006.01) |
| *G01S 13/89* | (2006.01) |
| *G01S 13/931* | (2020.01) |

(52) U.S. Cl.
CPC ............ *G01S 7/415* (2013.01); *G01S 13/583* (2013.01); *G01S 13/60* (2013.01); *G01S 13/89* (2013.01); *G01S 13/931* (2013.01); *G01S 2013/932* (2020.01)

(58) Field of Classification Search
CPC .. G01S 13/931; G01S 13/933; G01S 13/5248; G01S 13/60
USPC ........................................ 342/70, 63, 161, 76
See application file for complete search history.

(56) References Cited

U.S. PATENT DOCUMENTS

| | | | | |
|---|---|---|---|---|
| 8,825,260 | B1 * | 9/2014 | Silver ................... | G01S 13/931 |
| | | | | 342/159 |
| 8,965,561 | B2 * | 2/2015 | Jacobus ............... | G06Q 10/087 |
| | | | | 700/229 |
| 8,996,228 | B1 * | 3/2015 | Ferguson .............. | G01S 13/867 |
| | | | | 701/28 |
| 9,097,804 | B1 * | 8/2015 | Silver ................. | B60W 40/076 |
| 9,199,641 | B2 * | 12/2015 | Ferguson ................ | G01S 17/86 |
| 9,221,461 | B2 * | 12/2015 | Ferguson .............. | B60W 30/00 |
| 9,623,905 | B2 * | 4/2017 | Shashua .................... | G01S 5/16 |
| RE47,108 | E * | 10/2018 | Jacobus ............... | G05D 1/0274 |
| 10,139,833 | B1 * | 11/2018 | Zeng .................... | G05D 1/0214 |

(Continued)

*Primary Examiner* — Michael W Justice
(74) *Attorney, Agent, or Firm* — AVEK IP, LLC

(57) ABSTRACT

A method may involve sending signals with a frequency modulated continuous wave radar, receiving the signals reflected at the radar, and processing the received signals into point cloud data having a plurality of points. The method may involve assigning the plurality of points to a track and determining track information based on the plurality of points assigned to the track. The method may involve comparing track information against debounce criteria, where track information may be flagged as dynamic clutter by using a Kalman filter based algorithm on the track information. The method may include calculating a velocity of the vehicle based on the flagged track information. The method may change an operation of the vehicle in response to the calculated velocity of the vehicle.

17 Claims, 6 Drawing Sheets

(56)                References Cited

U.S. PATENT DOCUMENTS

| | | | | |
|---|---|---|---|---|
| 10,444,759 | B2 * | 10/2019 | Douillard | G05D 1/0212 |
| 10,935,652 | B2 * | 3/2021 | Branson | G01S 13/931 |
| 11,092,443 | B2 * | 8/2021 | Berry | G01C 21/30 |
| 11,635,507 | B2 * | 4/2023 | Healey | G01S 7/20 |
| | | | | 342/115 |
| 11,698,272 | B2 * | 7/2023 | Kroepfl | G01C 21/3815 |
| | | | | 701/409 |
| 11,713,978 | B2 * | 8/2023 | Akbarzadeh | G01C 21/3878 |
| | | | | 701/409 |
| 11,714,423 | B2 * | 8/2023 | Douillard | G01S 17/86 |
| | | | | 701/23 |
| 11,753,039 | B2 * | 9/2023 | Scott | G06N 3/08 |
| | | | | 701/26 |
| 11,788,861 | B2 * | 10/2023 | Nister | G01S 7/417 |
| | | | | 701/409 |
| 11,854,307 | B2 * | 12/2023 | Hu | G06V 10/95 |
| 12,084,077 | B2 * | 9/2024 | Thakur | B60W 50/14 |
| 2014/0063232 | A1 * | 3/2014 | Fairfield | G06V 20/58 |
| | | | | 382/104 |
| 2014/0067187 | A1 * | 3/2014 | Ferguson | B60W 60/0011 |
| | | | | 701/28 |
| 2014/0277691 | A1 * | 9/2014 | Jacobus | B66F 9/24 |
| | | | | 700/216 |
| 2015/0266472 | A1 * | 9/2015 | Ferguson | G01C 21/28 |
| | | | | 701/1 |
| 2017/0010618 | A1 * | 1/2017 | Shashua | G01C 21/3644 |
| 2017/0345311 | A1 * | 11/2017 | Sugiura | G06V 20/58 |
| 2017/0369054 | A1 * | 12/2017 | Nishimura | B60W 30/095 |
| 2018/0306912 | A1 * | 10/2018 | Branson | G01S 13/726 |
| 2018/0335787 | A1 * | 11/2018 | Zeng | B60W 30/12 |
| 2018/0357601 | A1 * | 12/2018 | Jacobus | B66F 9/0755 |
| 2018/0364717 | A1 * | 12/2018 | Douillard | G01S 17/931 |
| 2019/0286145 | A1 * | 9/2019 | LaFary | G05D 1/0255 |
| 2020/0026292 | A1 * | 1/2020 | Douillard | G06T 7/11 |
| 2020/0158515 | A1 * | 5/2020 | Berry | H04W 4/02 |
| 2021/0261154 | A1 * | 8/2021 | Wang | G01S 13/60 |
| 2022/0024486 | A1 * | 1/2022 | Scott | B60W 60/0025 |
| 2022/0283289 | A1 * | 9/2022 | Healey | G01S 13/726 |
| 2022/0309835 | A1 * | 9/2022 | Hu | G06T 7/246 |
| 2022/0348218 | A1 * | 11/2022 | Thakur | H04W 4/029 |
| 2025/0052590 | A1 * | 2/2025 | Yoshida | G01C 21/3819 |
| 2025/0244479 | A1 * | 7/2025 | Ikegami | G06V 20/58 |

* cited by examiner

METHODS FOR ESTIMATING DYNAMIC GROUND CLUTTER IN A VEHICLE-MOUNTED FREQUENCY MODULATED CONTINUOUS WAVE RADAR

RELATED APPLICATIONS

This application claims priority to U.S. Provisional Application No. 63/362,975, filed Apr. 14, 2022, the disclosure of which is incorporated herein by reference in their entireties.

FIELD OF THE DISCLOSURE

The disclosure relates generally to the field of vehicle-mounted radars. More specifically, the disclosure relates to estimating dynamic ground clutter in a vehicle-mounted frequency modulated continuous wave radar.

BRIEF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In some aspects, the techniques described herein relate to a method for detecting dynamic clutter with a frequency modulated continuous wave radar mounted on a vehicle, the method including the steps of: sending signals with the radar; receiving the signals reflected at the radar; processing the received signals into point cloud data having a plurality of points; assigning the plurality of points to a track; determining track information based on the plurality of points assigned to the track; compare track information against debounce criteria; flagging the track information as dynamic clutter by using a Kalman filter based algorithm on the track information; calculating a velocity of the vehicle based on the flagged track information; and changing an operation of the vehicle in response to the calculated velocity of the vehicle.

In some aspects, the techniques described herein relate to a method, wherein the point cloud data has a point cloud velocity, and the velocity of the vehicle is proportional to the point cloud velocity.

In some aspects, the techniques described herein relate to a method, wherein the step of calculating the velocity of the vehicle involves multiplying the point cloud velocity with a constant, and then adding an offset.

In some aspects, the techniques described herein relate to a method, wherein the debounce criteria include: a first requirement that the point cloud velocity be below a first threshold; a second requirement that an absolute difference between a radial velocity of one of the plurality of points and a radial velocity of a tracked object is above a second threshold; and a third requirement that a position of one of the plurality of points is within a boundary.

In some aspects, the techniques described herein relate to a method, wherein values for each of the first threshold, the second threshold, and the boundary are preselected.

In some aspects, the techniques described herein relate to a method, wherein flagging the track information as dynamic clutter involves the track information meeting the debounce criteria a plurality of times.

In some aspects, the techniques described herein relate to a method, wherein the received signals are reported to a computing system of the vehicle except for the track information flagged as dynamic clutter.

In some aspects, the techniques described herein relate to a method, wherein the track information flagged as dynamic clutter originates from signals bouncing off a ground surface.

In some aspects, the techniques described herein relate to a method, wherein changing the operation of the vehicle in response to the calculated velocity of the vehicle involves reducing a velocity of the vehicle.

In some aspects, the techniques described herein relate to a method, wherein a range of the track information remains relatively constant over time.

In some aspects, the techniques described herein relate to a method, wherein the Kalman filter based algorithm uses velocity variance terms that are greater than position variance terms.

In some aspects, the techniques described herein relate to a method, wherein the Kalman filter based algorithm uses velocity variance terms that are four times greater than the position variance terms.

In some aspects, the techniques described herein relate to a method, wherein the Kalman filter based algorithm relies on a 3-D Cartesian position and a 3-D Cartesian velocity, where process noise on position is zero and process noise on velocity is non-zero.

In some aspects, the techniques described herein relate to a method for detecting dynamic clutter with a frequency modulated continuous wave radar mounted on a vehicle, the method including the steps of: sending signals with the radar; receiving the signals reflected at the radar; processing the received signals into point cloud data; determine track information based on the point cloud data; compare track information against debounce criteria by using a Kalman filter based algorithm on the track information; flagging the track information that passes the debounce criteria as dynamic clutter; calculating a velocity of the vehicle based on the dynamic clutter; and changing an operation of the vehicle in response to the calculated velocity of the vehicle.

In some aspects, the techniques described herein relate to a method, where a field of view of the radar intersects a ground surface.

In some aspects, the techniques described herein relate to a method, wherein the debounce criteria include: a first requirement that a velocity of the point cloud data be below a first threshold; a second requirement that an absolute difference between a radial velocity of the point cloud data and a radial velocity of a tracked object is above a second threshold; and a third requirement that a position of the point cloud data is within a boundary.

In some aspects, the techniques described herein relate to a method, wherein the Kalman filter based algorithm used is weighted more towards position than velocity.

In some aspects, the techniques described herein relate to a method for detecting dynamic clutter with a frequency modulated continuous wave radar mounted on a moving platform, the method including the steps of: sending signals with the radar; receiving the signals reflected at the radar; processing the received signals into point cloud data; determine track information based on the point cloud data; use a Kalman filter based algorithm to flag the track information that passes debounce criteria as dynamic clutter; determining a velocity of the platform based on the dynamic clutter; and changing an operation of the vehicle in response to the calculated velocity of the platform.

In some aspects, the techniques described herein relate to a method, further including filtering out the dynamic clutter from information conveyed to an electronic control unit of the platform.

In some aspects, the techniques described herein relate to a method, where the track information that is flagged as dynamic clutter originates at a location where a field of view of the radar intersects a ground surface.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Figure 1:
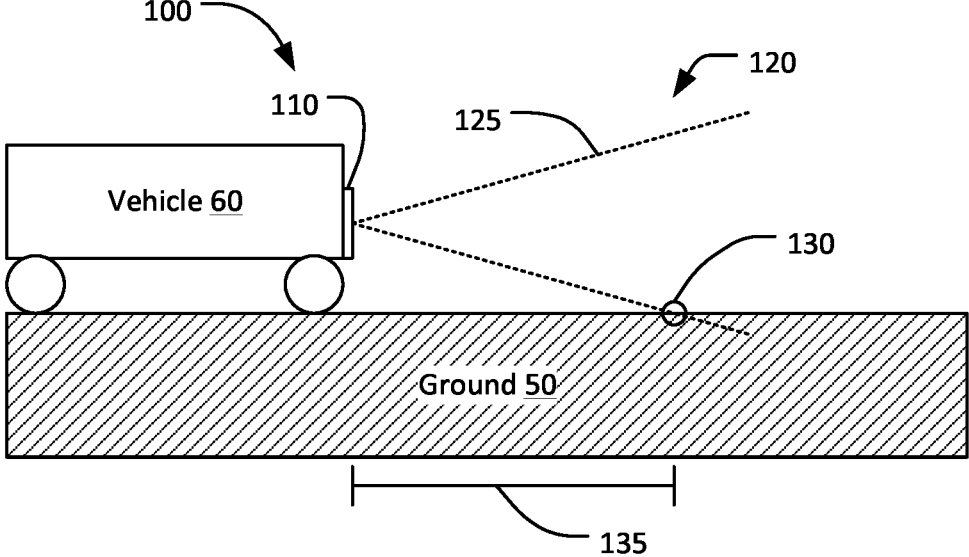
FIG. 1 schematically illustrates a radar field of view intersecting the ground surface.

Embodiments of the disclosure may relate to systems and methods for estimating dynamic clutter in a vehicle-mounted frequency modulated continuous wave (FMCW) radar. Radar technology may be used to detect objects (e.g., obstacles, signs, other vehicles, etc.) and characteristics thereof (e.g., distance or range to the detected object, the relative speed or radial velocity of the detected object, et cetera). The radar technology makes these detections by bouncing radar waves off of the objects and reading the waves that are reflected back. The artisan would understand that one application of FMCW radar is object detection for vehicles. In such an application, the radar is meant to detect objects, which in some cases are objects that the vehicle operator may not be aware of. In some applications, the radar may report the detection of the object to an electronic control unit (ECU). In response, the ECU may alert the operator and/or alter the operation of the vehicle to avoid a collision (e.g., reduce the speed of the vehicle, change the course of the vehicle, et cetera). False detections (i.e., determinations by the radar that an object is present when in fact no object is present) are problematic, as they may inaccurately portray the environment of the vehicle, lead to needless alarms, and/or cause an unwarranted change in vehicle operation by the ECU. As such, care is taken to minimize false detections.

FMCW radar designs tend to make several design tradeoffs in order to meet application requirements. One such tradeoff is the field of view (FOV) of the radar in elevation. A wide elevation FOV may be advantageous because it allows the radar to detect low profile objects. But, such a wide FOV can also cause the radar to report false detections due to reflections of its transmitted electromagnetic (EM) waves off of the ground.

Embodiments of the disclosure may be based on the observation that, for certain designs and mounting positions on a moving vehicle, commonly-used FMCW detection algorithms sometimes produce detections that have instantaneous radial velocities correlated to a speed of the vehicle (i.e., the detections are of an object that is moving relative to the vehicle). However, tracking these same detections over a period of time tends to reveal that these detections are not actually moving with respect to the vehicle (i.e., the range of the detection is nearly unchanging over time). This is unusual for objects that are detected to have any speed relative to the vehicle having the radar, since it logically follows that the object having relative speed should have moved some distance relative to the vehicle over time.

To illustrate further, as an example detection scenario, let us say there is a vehicle with a radar that is moving forward at five m/s, and the radar makes a detection of an object twelve meters in front of the vehicle. The detected object is found to be moving at a speed of eight m/s forward, or three m/s faster than the vehicle with the radar. It would normally be expected that after one second of travel, the detected object is three meters further ahead of the vehicle, for a total distance of fifteen meters (i.e., the original twelve meters plus the additional three meters traveled in the one second). However, in this case, the detected object may be found to still be twelve meters away. Even with the detected relative speed of three m/s faster than the vehicle, the detected object range or distance from the vehicle has not changed. Thus, the detected radial velocity of the points may be relatively high (i.e., since the instantaneous velocity of each point is high), while the radial velocity of the series of tracked points may be relatively low (i.e., because the actual position of the points tracked over a period of time is generally unchanged).

These findings may be explained as originating from detections that do not correspond to any actual physical objects as would be normally expected, but are instead caused by, for example, reflections between the radar and the ground and/or the vehicle body; as such, these detections may be considered to be clutter. This clutter may be considered dynamic since the clutter remains present even while the vehicle/radar moves. In embodiments of systems and methods described herein, such dynamic clutter may be differentiated from real objects by grouping together detected points with the aforementioned characteristics (e.g., detected points having constant range from the radar over time) in a modified Kalman Filter-based tracker. Once the dynamic clutter detections are clustered and tracked, they may be used to, for example, estimate the speed of the vehicle and/or be filtered out of the output of the radar.

FIGS. 1-5 illustrate an embodiment 100 of a detection system attached to a vehicle 60, and which may make use of methods 200 and 300 to detect and filter out dynamic clutter and/or use the dynamic clutter detections to determine a speed of the vehicle. Embodiments of the system 100 may make use of a computing system 400 (FIG. 6).

FIG. 1 shows an example arrangement of the detection system 100 mounted to a vehicle 60. Specifically, FIG. 1 shows a FMCW radar 110 mounted at or near the front of the vehicle 60, where the radar 110 may have a detection range 120 in a field of view ("FOV") 125. The radar 110 may detect and track objects within the detection range 120 within the FOV 125. However, as discussed above, the radar 110 may generate erroneous detections that do not correspond to an actual object. For example, as depicted in FIG. 1, the radar 110 may generate a false detection 130 where the FOV 125 of the radar 110 intersects the ground 60. Because this false detection 130 may always be at or around where the FOV 125 intersects the ground 50, the range 135 from the radar 110 to the detection 130 may remain roughly the same as the vehicle 60 travels.

Figure 2:
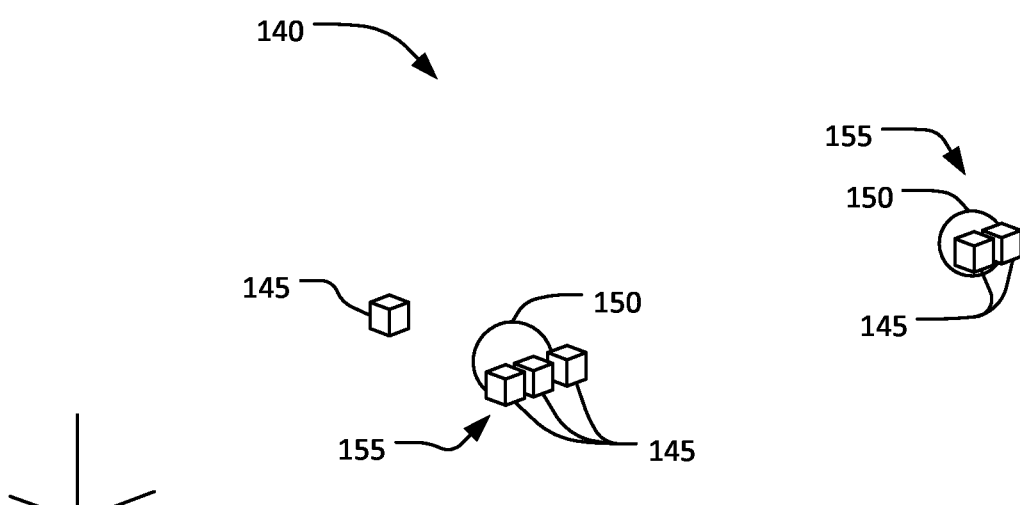
FIG. 2 schematically illustrates a point cloud point and tracked objects.

The output of radar 110 and/or the computing system 400 (e.g., a FMCW processing algorithm thereof) is one or more sets 140 of detections 145 (FIG. 2), sometimes referred to herein as "point clouds" 140, that reports characteristics (e.g., range, radial velocity, azimuth angle, elevation angle, etc.) of potential objects 150 that may be of interest. The point cloud 140 may further be processed by clustering points together into groups 155 that are estimated to be from the same physical object 150 (i.e., are in close proximity to each other), and then tracked over time using a tracking filter or observer. Each object 150 may generate, or have associated therewith, a plurality of detected points 145. The output of the tracking algorithm may be a set of tracked objects 155, which are then communicated to the vehicle ECU (e.g., the computing system 400). Examples of a point cloud 140 and tracked objects 155 are shown in FIG. 2.

In an embodiment, depending on the parameters of the radar 110 (e.g., the FOV 125, the mounting angle of the radar 110 on the vehicle 60, tuning parameters of the point cloud 140 detection method, etc.), the system 100 may detect one or more points 130 that do not correspond to any discrete object. Such points 130 may generally appear within a certain region that is a function of the radar FOV 125, the radar mounting angle, and the grade of the ground 60. These points 130 are referred to herein as "dynamic clutter" or "dynamic ground clutter," because, as opposed to static clutter, one or more of the characteristics of the point 130 may change based on the radar vehicle 60 motion. Each instance of dynamic clutter may generate, or have associated therewith, a plurality of points 130.

These dynamic clutter points 130 may be filtered out in order to prevent false detections. Because the velocity of these points 130 may be proportional to the velocity of the vehicle 60, they can also be used to estimate the speed of the vehicle 60. The disclosure may allow for the filtering out of these dynamic clutter points 130 of the detected environment of the vehicle 60, as well as use these dynamic clutter points 130 to estimate the speed of the vehicle 60 (e.g., by using points 130 identified by a modified Kalman filter-based tracking algorithm 160).

Figure 3:
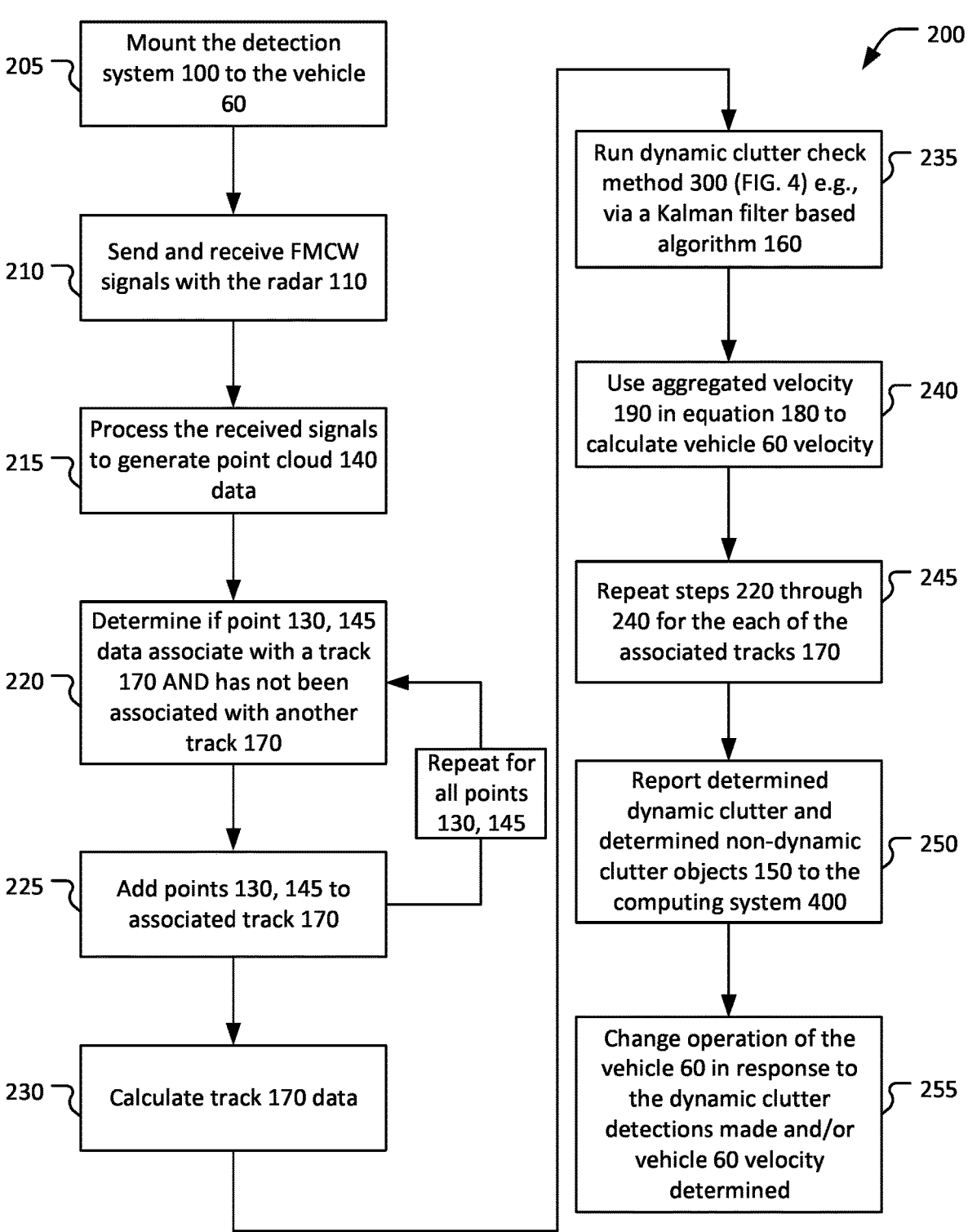
FIGS. 3 and 4 are flowcharts illustrating a method for estimating dynamic clutter using a Kalman Filter.
Figure 4:
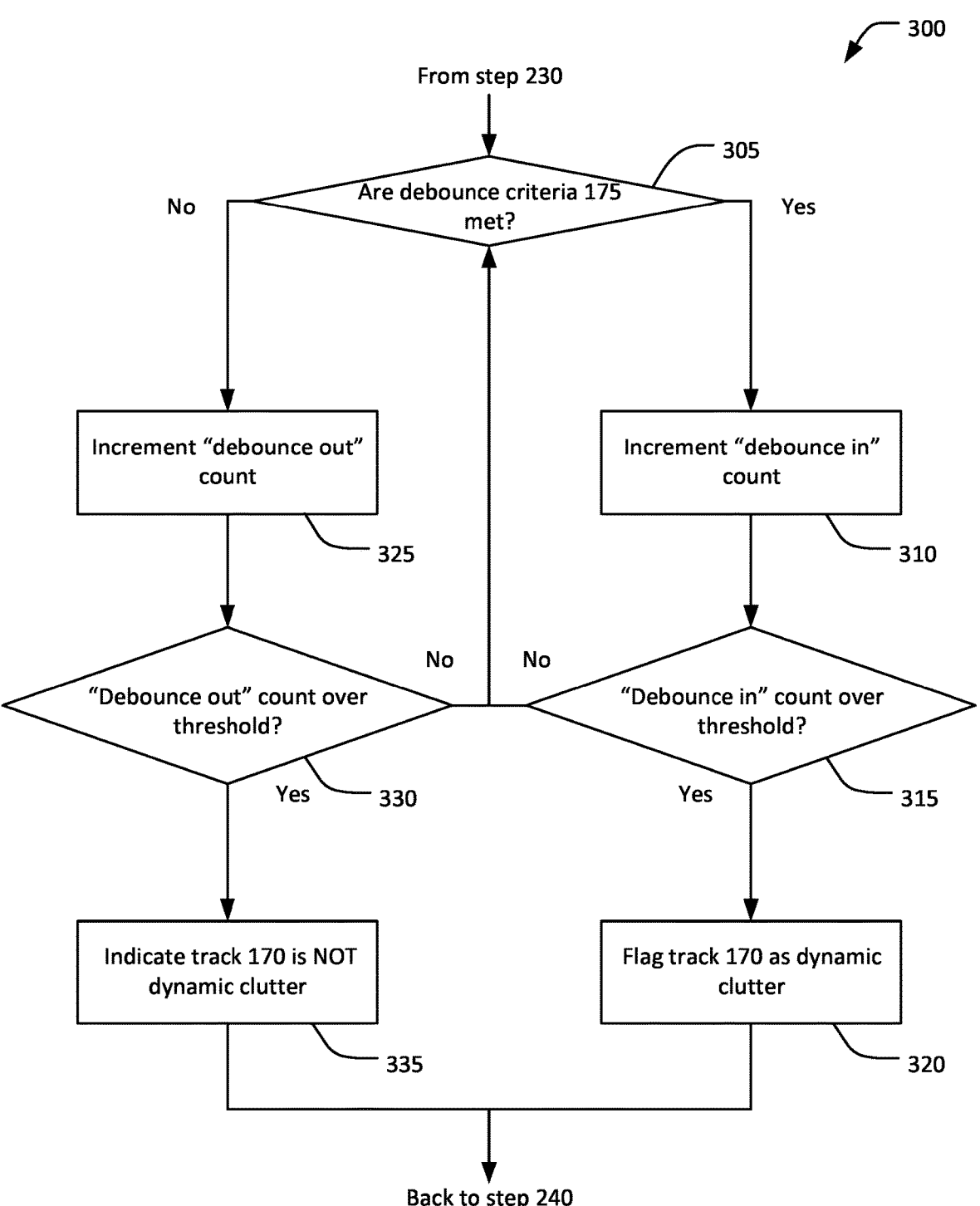

In an embodiment, the dynamic clutter may be classified by the methods 200 and 300, as described below and as shown in FIGS. 3 and 4. A modified Kalman filter-based tracker 160 (FIG. 4) may be tuned to give substantially more weight to range measurements than to velocity measurements of the detected points 130. The method 200 may include creating tracks or filters 170 (FIG. 5) based on some or all of the detected points 130. Then, it may be determined whether certain conditions or criteria 175 (FIG. 4) are met for each active track 170 and points 130 associated with it after a new set of point clouds 140 is processed. These points 130 may be disregarded or included based on whether or not they meet the criteria 175, through a "debouncing" or "dynamic clutter check" method 300 (FIG. 4). These conditions 175 may include, for example, ensuring: (a) the estimated velocity of the track 170 (e.g., a point cloud 140 thereof) is low (e.g., below a threshold); (b) the absolute difference between the radial velocity of the associated points 130 and the estimated radial velocity of the tracked object 150 is high (e.g., above a threshold); and (c) the positions of the associated points 130 are within certain boundaries. Detected points 130 that do meet or satisfy one or more of these criteria may be considered to have only temporarily met the status of being dynamic clutter. If enough points 130 (e.g., above a threshold) of a given track 170 do not meet the criteria set forth in the method 300, then that track 170 may be disregarded; whereas, if the criteria are met for enough points 130 (e.g., above a threshold) then the track 170 may be considered as dynamic clutter. It is to be understood that each of the thresholds and boundaries may be preselected based on characteristics of the radar 110 (e.g., the FOV 125, the mounting angle of the radar 110 on the vehicle 60, tuning parameters of the point cloud 140 detection method, et cetera).

Consider an example Kalman filter tracker 160 described by the following equations:

$$\hat{x}_{k-}=F\hat{x}_{k-1}$$

$$P_{k-}=FP_{k-1}F^{T}+Q_{k}$$

$$K_{k}=P_{k-}H^{T}(HP_{k-}H^{T}+R_{k})^{-1}$$

$$P_{k+}=(I-K_{k}H)P_{k-}$$

$$\hat{x}_{k+}=\hat{x}_{k-}+K_{k}(z_{k}-H\hat{x}_{k-})$$

If the state of the system consists of the three-dimensional Cartesian position and three-dimensional Cartesian velocity, then the process noise on position can be assumed to be zero, while the process noise on velocity is non-zero. The covariance of the process noise on velocity can be tuned independently for the X, Y, and Z velocity components. The other tunable parameters in the observer may be the measurement noise covariances and the initial estimate of the state covariance. Example values for these parameters are:

$$Q=[0_{3\times3},diag(\sigma_{v,process,x}{}^{2}\sigma_{v,process,y}{}^{2}\sigma_{v,process,y}{}^{2})]=$$
$$[0_{3\times3},diag(6.25\ 6.25\ 6.25)]$$

$$R=diag(\sigma_{v,measurement,radial}{}^{2}\sigma_{p,measurement,x}{}^{2}$$
$$\sigma_{p,measurement,y}{}^{2}\sigma_{p,measurement,z}{}^{2})=diag(25\ 1\ 1\ 1)$$

$$P_{init}=diag(\sigma_{p,x}{}^{2}\sigma_{p,y}{}^{2}\sigma_{p,z}{}^{2}\sigma_{v,x}{}^{2}\sigma_{v,y}{}^{2}\sigma_{v,z}{}^{2})=diag(0.25$$
$$0.25\ 0.25\ 1\ 1\ 1)$$

Note that the variance terms for velocity may all be greater than those for position (e.g., four times greater than the variance terms for position). This is an example of how the filter 160 may be tuned to give more weight to position than to velocity.

Examples of the criteria 175 used to implement the method described in FIG. 4 are:

Maximum velocity magnitude: 2 m/s;

Minimum absolute difference b/w track velocity magnitude and associated point velocity: 0.2 m/s;

X position minimum: 1 m;

X position maximum: 2.2 m;

Y Position minimum: −1.5 m;

Y Position maximum: 1.5 m;

Z Position minimum: −3 m;

Z position maximum: 0 m;

Debounce in count threshold: 2; and

Debounce out count threshold: 3.

The speed of the vehicle 60 may then be estimated using the following equation 180, where K is a scaling factor and C is an offset:

Vehicle Velocity=$K$*(point cloud velocity)+$C$

One or both of K and C may be a constant or may be a function of the point cloud 140 velocity. If more than one point cloud point 145 is associated with the tracked object 150, the point cloud 140 velocity can be the maximum, minimum, or mean velocity of the associated points 145.

One or more debouncing steps may be applied, in method 300 as shown in FIG. 4, to filter out transient conditions that meet the criteria only temporarily. If the debouncing filter method steps 300 criteria is passed, the tracked object 150 may be reported to the host (e.g., the vehicle ECU, the computing system 400, etc.) as being dynamic clutter. The host may then use that information to ignore the track 170 and/or determine a vehicle 60 speed estimate as needed.

Figure 5:
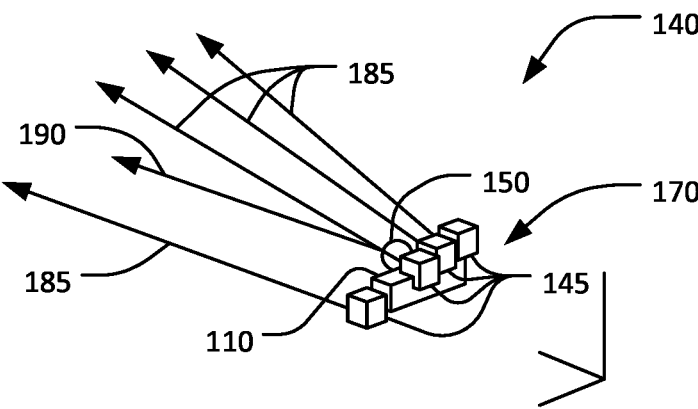
FIG. 5 schematically illustrates an example estimation of dynamic clutter.
Figure 6:
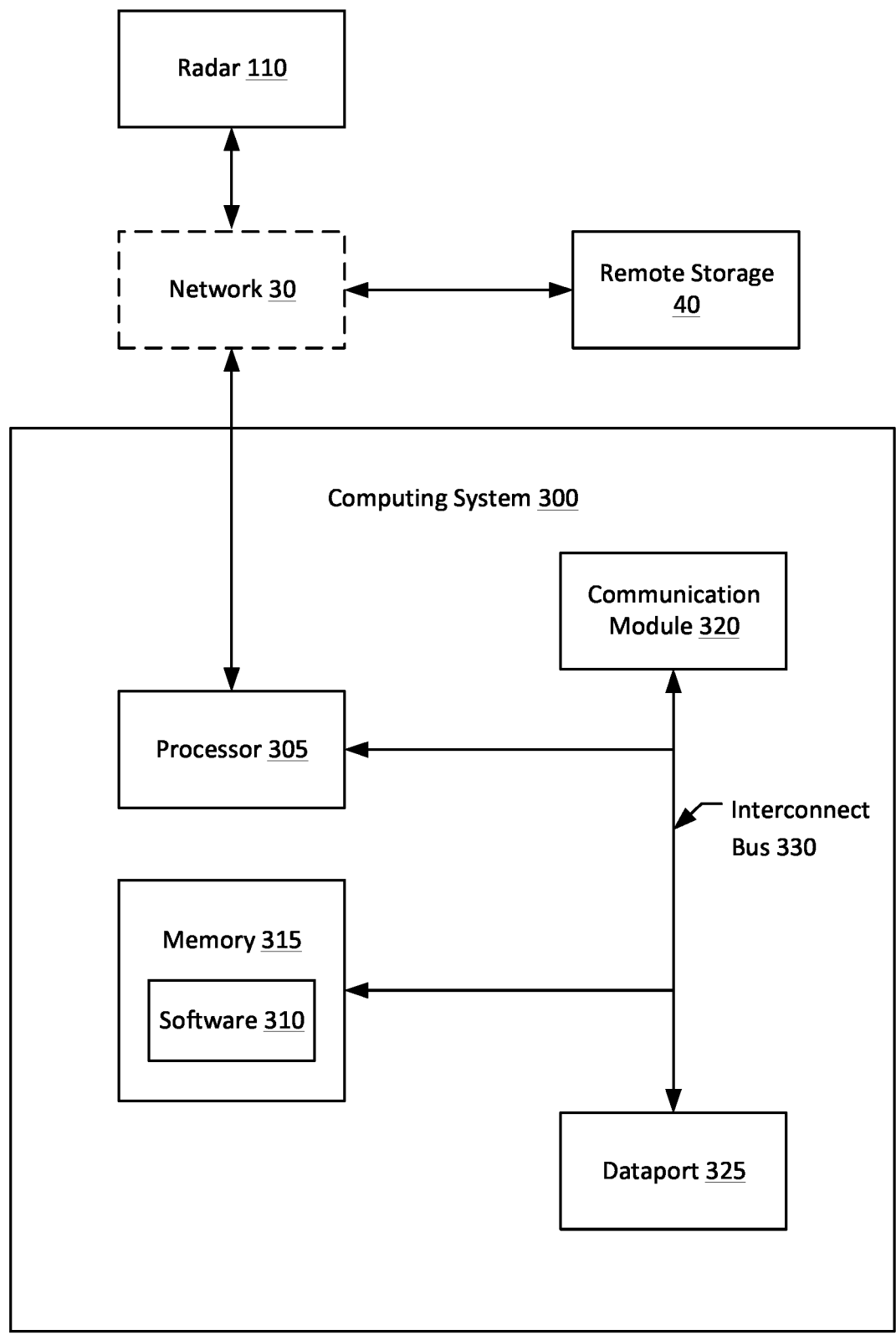
FIG. 6 is a block diagram illustrating a computing system of the detection system of FIG. 1.

FIG. 5 shows example results of estimated dynamic clutter. The result in FIG. 5 is from test data collected with a radar 110 mounted on a vehicle 60. The length and direction of arrows 185 represent the estimated velocity of the track 170 (e.g., of each point 145 thereof), which may be aggregated and used to approximate the velocity 190 of the vehicle 60 on which the radar 110 was mounted (e.g., by using the equation 180).

An example of using the methods 200 and 300 are now detailed with respect to FIGS. 3 and 4. Starting with step 205 of the method 200, the detection system 100 may be mounted to a vehicle 60. This may involve, for example, mounting an FMCW radar or antenna 110 on the vehicle (e.g., on a front area thereof). Next, at step 210, the detection system may transmit and receive signals (e.g., electromagnetic or radar waves) within the detection range 120 of the radar 110. At step 215, the radar 110 may process the received signals carrying the point cloud 140 data (e.g., point 130 and 145 information).

Then, at step 220 and for each point 130, 145 collected, the point 130, 145 data may be checked to see if a particular point 130, 145 associate with a track 170, and that the point 130, 145 is not associated with another track 170. If these criteria are met, then the point 130, 145 may be added to the track 170 at step 225. Steps 220 and 225 may repeat for each collected point 130, 145 until all points 130, 145 are assigned to a preexisting track 170 or a new track 170.

Next, at step 230, aggregated point 130, 145 data 190 may be calculated for the associated points in the track 170. For example, the mean, max, minimum, etc., of one or more characteristics of the points 130, 145 of the track 170 may be calculated. Then, at step 235, a dynamic clutter check method 300 may be carried out on the track 170 via, e.g., the Kalman filter based algorithm 160. This step 235 is shown in greater detail in method 300 below and in FIG. 4.

If the track 170 is determined to be dynamic clutter, then, at step 240, the aggregated velocity 190 of the track 170 may be set as the vehicle 60 velocity estimate (e.g., by inputting the aggregated data 190 into the equation 180). The method 200 may continue processing the collected point data at step 245. The steps 220 through 245 may be repeated for each associated track 170 of the collected point 130, 145 data. Once the collected point 130, 145 data is processed, then at step 250, the tracks 170 determined to be dynamic clutter and the other tracks 170 associated with objects 150 may be reported to the vehicle 60 (e.g., an ECU and/or computing system 400 thereof). There, at step 255, the vehicle 60 may respond to the dynamic clutter detections and/or the readings derived therefrom. For example, a computing system 400 of the vehicle 60 may respond to a velocity 190 detection by changing the operation of the vehicle 60 (e.g., by modifying a speed of the vehicle 60).

Turning now to FIG. 4, the dynamic clutter check method 300 is detailed. The point 130, 145 data determined in step 230 of the method 200 may be used, in step 305, to check whether points 130, 145 fall within the dynamic clutter criteria 175. If the criteria 175 is satisfied, then, at step 310, a "debounce in" counter may be incremented. A check may then be executed, at step 315, to see if the "debounce in" counter has reached a certain threshold. Once this threshold has been reached, then at step 320, the track 170 may be flagged as dynamic clutter, the counters may be reset, and the method 300 may return to the method 200. If the counter threshold has not been reached, then the step 305 may be repeated with the next point 130, 145 data.

However, if the criteria 175 is not satisfied at step 305, then, at step 325, a "debounce out" counter may be incremented. A check may then be executed, at step 330, to see if the "debounce out" counter had reached a certain threshold. Once this threshold has been reached, then at step 335, the track 170 may be flagged as not being dynamic clutter, the counters may be reset, and the method 300 may return to the method 200. If the counter threshold has not been reached, then the step 305 may be repeated with the next point 130, 145 data.

It is to be understood that the steps of the method 200 and/or the method 300 may be modified, added to, and/or omitted as desired, and that such considerations have been contemplated and are within the scope of the present disclosure. For example, the artisan may understand that the method 200 may forego the step 205 of attaching the detection system 100 to a vehicle 60 (e.g., in situations where the vehicle 60 already has a detection system 100).

FIG. 6 is a functional block diagram of the computing system 400 which may be used to implement the various printer and/or labeling apparatus embodiments according to the different aspects of the present disclosure. The computing system 400 may be, for example, a smartphone, a laptop computer, a desktop computer, a flexible circuit board, or other computing device whether now known or subsequently developed. The computing system 400 comprises a processor 405, the memory 415, a communication module 420, and a dataport 425. These components may be communicatively coupled together by an interconnect bus 430. The processor 405 may include any processor used in smartphones and/or other computing devices, including an analog processor (e.g., a Nano carbon-based processor). In certain embodiments, the processor 405 may include one or more other processors, such as one or more microprocessors, and/or one or more supplementary co-processors, such as math co-processors. In embodiments, the computing system 400 may make use of a Linux CUPS driver which is compatible with ARM and/or AMD processing languages.

The memory 415 may include both operating memory, such as random access memory (RAM), as well as data storage, such as read-only memory (ROM), hard drives, optical, flash memory, or any other suitable memory/storage element. The memory 415 may include removable memory elements, such as a CompactFlash card, a MultiMediaCard (MMC), and/or a Secure Digital (SD) card. In certain embodiments, the memory 415 includes a combination of magnetic, optical, and/or semiconductor memory, and may include, for example, RAM, ROM, flash drive, and/or a hard disk or drive. The processor 405 and the memory 415 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 405 may be connected to the memory 415 via the dataport 425.

The communication module 420 may be configured to handle communication links between the computing system 400 and other external devices or receivers, and to route incoming/outgoing data appropriately. For example, inbound data from the dataport 425 may be routed through the communication module 420 before being directed to the processor 405, and outbound data from the processor 405 may be routed through the communication module 420 before being directed to the dataport 425. The communication module 420 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The dataport 425 may be any type of connector used for physically interfacing with a smartphone, computer, and/or other devices, such as a mini-USB port or an IPHONE®/IPOD® 30-pin connector or LIGHTNING® connector. In other embodiments, the dataport 425 may include multiple communication channels for simultaneous communication with, for example, other processors, servers, and/or client terminals.

The memory 415 may be a computer-readable medium which may store instructions for communicating with other systems, such as a computer. The memory 415 may store, for example, a program (e.g., computer program code) adapted to direct the processor 405 in accordance with the embodiments (e.g., the methods 200 and 300) described herein. The instructions also may include program elements, such as an operating system. While execution of sequences of instructions in the program causes the processor 405 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 415 includes software 410. The software 410 may contain machine-readable instructions configured to be executed by the processor 405. The software 410 may, for example, process data obtained from the detection system 100. In embodiments, the software 410 may cause the computing system 400 to dynamically respond to a reading obtained by the detection system 100. For example, the software 410 may direct the vehicle 60 to slow down in response to a system 100 detection of an object. As another example, the software 410 may change a speed of the vehicle in response to a radar 100 determination of the vehicle speed based on detections provided by the method(s) 200 and 300.

The computing system 400 may be in data communication with a remote storage 40 over a network 30. The network 30 may be a wired network, a wireless network, or comprise elements of both. In embodiments, the network 30 may communicatively link one or more components of the labeling apparatus 100. For example, the detection system 100 may be communicatively linked to the computing system 400 via the network 30 for the exchange of information therebetween. The remote storage 40 may be, for example, the "cloud" or other remote storage in communication with other computing systems. In embodiments, data (e.g., readings obtained by the detection system 100 and the dynamic responses of the computing system 400 thereto) may be stored in the remote storage 40 for analytics.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. Not all steps listed in the drawings need be carried out in exactly the order shown.

The invention claimed is:

1. A method for detecting dynamic clutter with a frequency modulated continuous wave radar mounted on a vehicle, the method comprising the steps of:
   sending signals with the frequency modulated continuous wave radar;
   receiving the signals reflected at the frequency modulated continuous wave radar;
   processing the received signals into point cloud data having a plurality of points;
   assigning the plurality of points to a track;
   determining track information based on the plurality of points assigned to the track;
   comparing track information against debounce criteria;
   flagging the track information as dynamic clutter by using a Kalman filter based algorithm on the track information;
   calculating a velocity of the vehicle based on the flagged track information; and
   changing an operation of the vehicle in response to the calculated velocity of the vehicle;
   wherein:
      the point cloud data has a point cloud velocity;
      the velocity of the vehicle is proportional to the point cloud velocity; and
      calculating the velocity of the vehicle involves multiplying the point cloud velocity with a constant, and then adding an offset.

2. The method of claim 1, wherein the debounce criteria include:
   a first requirement that the point cloud velocity be below a first threshold;
   a second requirement that an absolute difference between a radial velocity of one of the plurality of points and a radial velocity of a tracked object is above a second threshold; and
   a third requirement that a position of one of the plurality of points is within a boundary.

3. The method of claim 2, wherein values for each of the first threshold, the second threshold, and the boundary are preselected.

4. The method of claim 1, wherein flagging the track information as dynamic clutter involves the track information meeting the debounce criteria a plurality of times.

5. The method of claim 1, wherein the received signals are reported to a computing system of the vehicle except for the track information flagged as dynamic clutter.

6. The method of claim 1, wherein the track information flagged as dynamic clutter originates from signals bouncing off a ground surface.

7. The method of claim 1, wherein changing the operation of the vehicle in response to the calculated velocity of the vehicle involves reducing a velocity of the vehicle.

8. The method of claim 1, wherein a range of the track information remains relatively constant over time.

9. The method of claim 1, wherein the Kalman filter based algorithm uses velocity variance terms that are greater than position variance terms.

10. The method of claim 9, wherein the Kalman filter based algorithm uses velocity variance terms that are four times greater than the position variance terms.

11. The method of claim 1, wherein the Kalman filter based algorithm relies on a 3-D Cartesian position and a 3-D Cartesian velocity, where process noise on position is zero and process noise on velocity is non-zero.

12. A method for detecting dynamic clutter with a frequency modulated continuous wave radar mounted on a vehicle, the method comprising the steps of:

sending signals with the frequency modulated continuous wave radar;

receiving the signals reflected at the frequency modulated continuous wave radar;

processing the received signals into point cloud data;

determining track information based on the point cloud data;

compare track information against debounce criteria by using a Kalman filter based algorithm on the track information;

flagging the track information that passes the debounce criteria as dynamic clutter;

calculating a velocity of the vehicle based on the dynamic clutter; and changing an operation of the vehicle in response to the calculated velocity of the vehicle;

wherein the Kalman filter based algorithm used is weighted more towards position than velocity.

13. The method of claim 12, where a field of view of the frequency modulated continuous wave radar intersects a ground surface.

14. The method of claim 12, wherein the debounce criteria include:

a first requirement that a velocity of the point cloud data be below a first threshold;

a second requirement that an absolute difference between a radial velocity of the point cloud data and a radial velocity of a tracked object is above a second threshold; and a third requirement that a position of the point cloud data is within a boundary.

15. A method for detecting dynamic clutter with a frequency modulated continuous wave radar mounted on a moving platform, the method comprising the steps of:

sending signals with the frequency modulated continuous wave radar;

receiving the signals reflected at the frequency modulated continuous wave radar;

processing the received signals into point cloud data;

determining track information based on the point cloud data;

using a Kalman filter based algorithm to flag the track information that passes debounce criteria as dynamic clutter;

determining a velocity of the platform based on the dynamic clutter; and changing an operation of the platform in response to the calculated velocity of the platform;

wherein the debounce criteria includes:

a first requirement that a velocity of the point cloud data be below a first threshold; and a second requirement that an absolute difference between a radial velocity of the point cloud data and a radial velocity of a tracked object is above a second threshold.

16. The method of claim 15, further comprising filtering out the dynamic clutter from information conveyed to an electronic control unit of the platform.

17. The method of claim 15, where the track information that is flagged as dynamic clutter originates at a location where a field of view of the frequency modulated continuous wave radar intersects a ground surface.

* * * * *